United States Patent
Amos et al.

(10) Patent No.: US 7,152,864 B2
(45) Date of Patent: Dec. 26, 2006

(54) SEAL ASSEMBLY

(75) Inventors: Peter G. Amos, Essex, CT (US); Gordon McColvin, Lincoln (GB); D. Gregory More, Middleton, CT (US)

(73) Assignee: Alstom Technology Ltd., Baden (CH)

(*) Notice: Subject to any disclaimer, the term of this patent is extended or adjusted under 35 U.S.C. 154(b) by 0 days.

(21) Appl. No.: 10/676,087

(22) Filed: Oct. 2, 2003

(65) Prior Publication Data

US 2005/0073114 A1 Apr. 7, 2005

(51) Int. Cl.
*F16J 15/08* (2006.01)
*F01D 11/00* (2006.01)

(52) U.S. Cl. .................. 277/650; 277/654; 415/173.7; 415/138

(58) Field of Classification Search ................ 277/650, 277/654, 644; 415/138, 173.7, 191
See application file for complete search history.

(56) References Cited

U.S. PATENT DOCUMENTS

| | | | | |
|---|---|---|---|---|
| 3,858,891 A | * | 1/1975 | Trelease | 277/652 |
| 3,975,114 A | * | 8/1976 | Kalkbrenner | 415/210.1 |
| 4,063,845 A | * | 12/1977 | Allen | 415/134 |
| 4,441,726 A | | 4/1984 | Uhl | 277/230 |
| 4,645,217 A | * | 2/1987 | Honeycutt et al. | 277/555 |
| 5,209,503 A | * | 5/1993 | Heibel et al. | 277/637 |
| 5,333,443 A | | 8/1994 | Halila | 60/39.31 |
| 5,657,998 A | * | 8/1997 | Dinc et al. | 277/653 |
| 6,325,392 B1 | | 12/2001 | Halling | 277/654 |
| 6,450,762 B1 | | 9/2002 | Munshi | 415/138 |
| 6,502,825 B1 | * | 1/2003 | Aksit et al. | 277/355 |
| 6,547,257 B1 | * | 4/2003 | Cromer | 277/630 |
| 6,637,751 B1 | * | 10/2003 | Aksit et al. | 277/416 |
| 6,733,234 B1 | * | 5/2004 | Paprotna et al. | 415/138 |
| 2003/0010038 A1 | | 1/2003 | Maghon | 60/796 |
| 2003/0079475 A1 | | 5/2003 | Schmahl et al. | 60/752 |

FOREIGN PATENT DOCUMENTS

| | | |
|---|---|---|
| EP | 0 277 724 A2 | 8/1988 |
| EP | 0 277 724 A3 | 3/1989 |
| EP | 1 323 957 A2 | 7/2003 |
| EP | 1 323 957 A3 | 1/2004 |

* cited by examiner

*Primary Examiner*—Vishal Patel
(74) *Attorney, Agent, or Firm*—Cermak & Kenealy, LLP; Adam J. Cermak

(57) ABSTRACT

It is disclosed a seal assembly (5) which comprises a layered structure. It consists of a first layer (9, 12) of a base material, a second layer (10) of thermal insulating material on top of the base material and a third layer (11, 12) of base material or an oxide resistant material on top of the second layer (10) of thermal insulation. The inventive seal assembly (5) described herein can be arranged between combustor liner segments (2).

31 Claims, 3 Drawing Sheets

SEAL ASSEMBLY

BACKGROUND OF THE INVENTION

1. Field of the Invention

The invention relates to a seal assembly having a laminated structure.

2. Brief Description of the Related Art

Modern large industrial gas turbines have a shielded combustor such as known from US-B1-6,450,762. Due to the ever greater need for efficiency and combustor stability, the arrangement requires primary to secondary air system seals to be fitted. Driven by the work on known combustor systems, the seals are exposed to ever-higher temperatures, extending to a temperature up to 1500° C. on the hot gas side. It is this thermal exposure that drives the need to define a seal assembly that can live with these temperatures while remaining resilient and responsive to system movement. Highly stressed metals are subject to severe stress relaxation at high temperatures, rendering them useless as resilient sealing elements under such conditions. Even the so called nickel based super alloys such as Inconel 718 and other materials show little ability to withstand exposure to high temperatures beyond 700° C. in a stressed condition without suffering severe stress relaxation and/or creep.

Conventional solutions use cooled seals whereby substantial quantities of cooling air flow are required. This use of cooling reduces the efficiency of the gas turbine and can impair flame stability.

SUMMARY OF THE INVENTION

It is the aim of the present invention is to provide an advanced seal assembly which remains flexible and resilient as a spring, by keeping the spring element at or near to the temperature of the cooler secondary airflow. Hence, part of the seal assembly must defined to shield the spring element without allowing heat radiation or conduction to heat the spring side support.

According to the present invention, a seal assembly was found, the seal assembly comprising a layered structure consisting of a first layer of a base material, a second layer of thermal insulating material on top of the first layer and a third layer of a base material or oxidation resistant material on top of the layer of thermal insulation.

The layer of thermal insulating material can consist of a woven insulating material, whereas the first and/or third layer of base material consists of any standard seal material such as Inconel 718. A third layer exposed to a hot gas path could consists of an oxidation resistant material such as PM2000.

The layered structure can be arranged within a connector plate. The connector plate is constructed with a composite structure which removes radiation and conduction from the central connector plate to a spring side support, in a way that the seal assembly remains within the temperature range of the cold gas flow and therefore advantageously flexible and actively sprung in its location during operation of the combustor. The layer of thermal insulating material is woven into strips which may be aligned with or at a defined angle to the primary axis to ensure flexibility.

The layer of the oxide resistant material can be welded to the layer of base material of the connector plate.

In another embodiment of an inventive seal assembly, the layer of thermal insulating material is arranged between two conventional E-seals as first and third layer.

The seal assembly described herein can be a seal between combustor liner segments between combustor liner segments.

BRIEF DESCRIPTION OF THE DRAWINGS

Preferred embodiments of the present invention are illustrated in the accompanying drawings, in which.

The drawings show only the parts important for the invention. Same elements will be numbered in the same way in different drawings.

DESCRIPTION OF THE PREFERRED EMBODIMENTS

Figure 1:
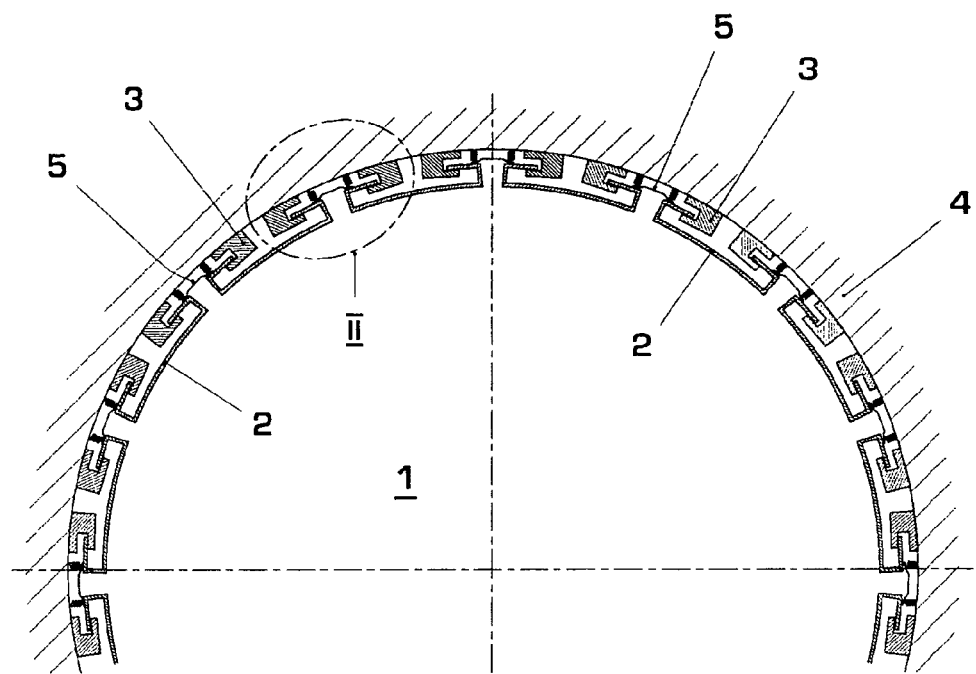
FIG. 1 shows a combustor liner assembly of a shielded combustion chamber of a large industrial gas turbine.
Figure 2:
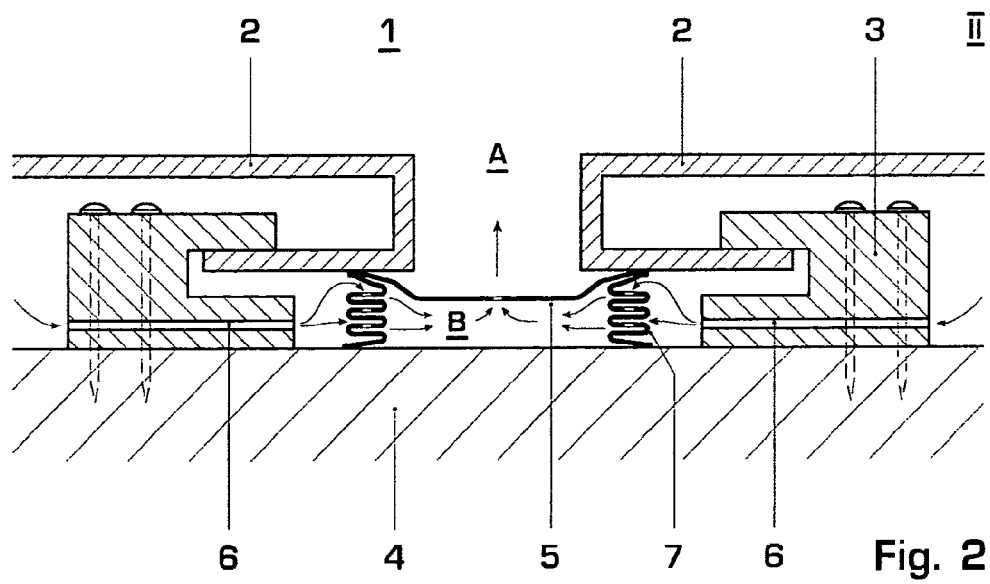
FIG. 2 illustrates the arrangement of a seal between two combustor liner segments as seen in the detail II in the FIG. 1.

FIG. 1 shows a cross sectional view through a combustor liner assembly of a shielded combustion chamber 1 of a large industrial gas turbine. Over the circumference of the casing 4 of the combustion chamber 1 are arranged a plurality of combustor liner segments 2, which are fixed to clamp strips 3. As seen in detail in FIG. 2, which shows the detail II of FIG. 1, between two combustor liner segments 2 is arranged a seal 5, which is an axial combustor double E-seal. Through cooling holes 6 within the clamp strip 3 and cooling holes within the seal 5 flows a cooling medium towards the combustion chamber 1. The seal or seal assembly 5 is on a side A exposed to the hot gases of the combustion chamber 1 having a temperature of up to 1500° C. and on the other side B to the cooling medium having a temperature of up to 600° C. To remain flexible and actively sprung in its location between the combustor liner segments 2, the spring side supports 7 of the seal assembly 5 must remain within the temperature of the cold gas flow.

Figure 3:
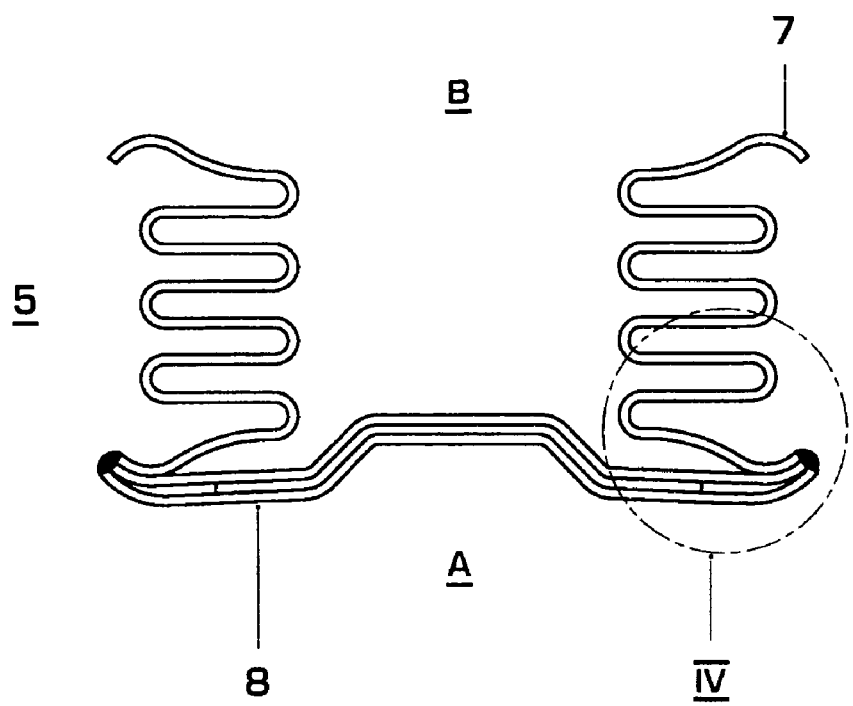
FIG. 3 illustrates a seal assembly according to the present invention.
Figure 4:
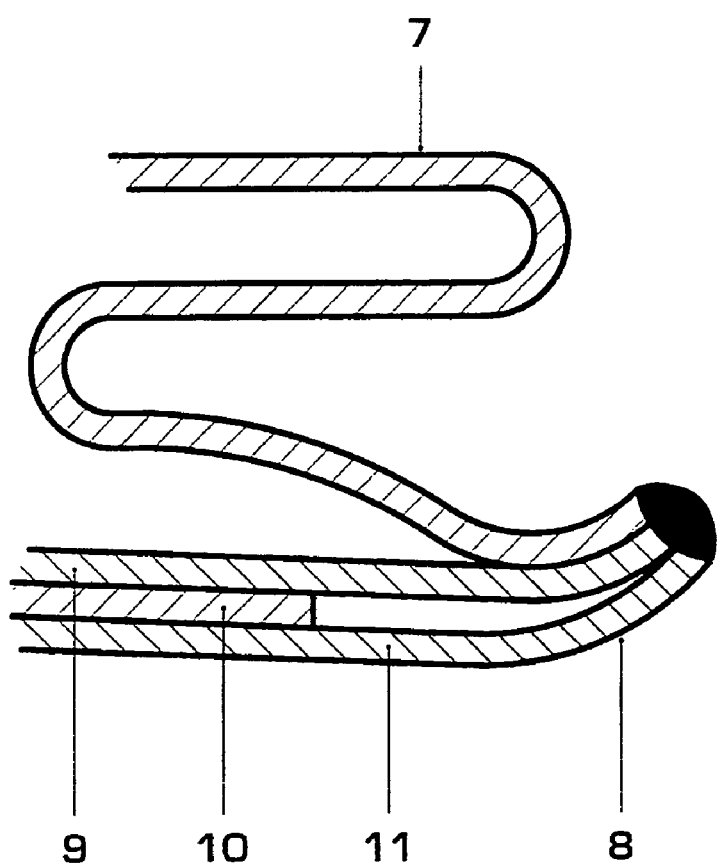
FIG. 4 illustrates the detail IV in the FIG. 3.

FIG. 3 illustrates a seal assembly 5 according to the present invention The inventive seal assembly 5 comprises two spring side supports 7 and a laminated connector plate 8. The spring side supports 7 are connected to the connector plate 8 by means of welding. To remove heat radiation from the central connector plate 8 to spring side supports 7, the connector plate 8 is constructed with a composite structure as seen in FIGS. 3 and 4. Thereby, FIG. 4 illustrates the detail IV of the FIG. 3.

As seen in FIG. 4 composite laminated connector plate 8 consists of three different layers 9, 10, 11. A first layer 9 of a base material or inner connector band, which can be made from a standard seal material, such as Inconel 718, is responsible for the structural integrity of the seal assembly 5. Any other standard seal material may be used as well. The second layer 10 of the thermal insulating material, such as Nextel or any other suitable material on top of the layer 9 of base material, is made from a woven material. A third layer 11 on top of the layer 10 of a thermal insulating material can be made of a base material such as Inconel 718 as well or it can be made of an oxide resistant material from any suitable oxidation resisting material. The layer 10 of thermal insulating material is woven into strips which maybe aligned with or at a defined angle to the primary axis to ensure flexibility.

Since no data relative to radiation or forced convection is currently available, the following calculation of heat flux through the layered structure of the connector plate 8 was based on the starting assumptions noted below, for conductive heat transfer only within a seal 5 consisting of a layered structure of a first layer 9 of Inconel 718, a second layer 10 of Nextel and a third layer 11 of Inconel 718.

Assumed external skin temperature of the outer Inconel 718 ply ($t_1$): 1200° C.

Assumed external skin temperature of the inner Inconel 718 ply ($t_4$): 600° C.

Temperatures $t_2$, $t_3$, and heat flux are calculated by solving three simultaneous equations for equal heat flux through each layer of the sandwich (Inconel 718/Nextel/Inconel 718), which must always be true. The solution, for the assumed conditions, is 0.32 W/mm². This is for a single ply of Nextel high-grade (>99%) alumina ($Al_2O_3$) cloth, 0.28 mm thick (0.011 inch), with a 2000° C. melting point and two plies of 0.20 mm thick (0.008") Inconel 718.

| | | |
|---|---|---|
| Coeff of thermal conductivity of Inconel 718 | | 23.9 W/mK |
| Coeff of thermal conductivity of Nextel | | 0.16 W/mK |
| Temp of hot surface of Inconel 718 outer ply | $t_1$ | 1200° C. |
| Temp of cool surface of Inconel 718 outer ply | $t_2$ | 1197.3° C. |
| Temp of hot surface of Nextel | $t_2$ | 1197.3° C. |
| Temp of cool surface of Nextel | $t_3$ | 602.7° C. |
| Temp of hot surface of Inconel 718 inner ply | $t_3$ | 602.7° C. |
| Temp of cool surface of Inconel 718 inner ply | $t_4$ | 600° C. |

| Heat | $t_1$ to $t_2$ | $t_2$ to $t_3$ | $t_3$ to $t_4$ | |
|---|---|---|---|---|
| Flux | 0.32 | 0.32 | 0.32 | W/mm² |

The Nextel is very effective in protecting the Inconel 718. However, since the coefficient of thermal conductivity of Nextel cloth is very low (approx 0.16 W/mK) compared with Inconel 718 (23.9 W/mK), care should be exercised to avoid overheating of the outer Inconel 718 layer 11 exposed to temperatures as high as 1530° C. The melting point of Inconel 718 or Haynes 25 is 1332° C. approximately.

Assuming the combustion chamber 1 contains very high velocity turbulent gas flow, it may reasonably be assumed that a high rate of heat transfer exists, both as radiation from the flame and from (local) hot surfaces, as well as forced convection (if the seal 5 is in a high velocity zone and unshielded). It may therefore be assumed that the outer layer 11 of the connector plate 8 will be at temperature relatively close to the local temperature in the combustion chamber 1. Therefore it is necessary to ensure that sufficient cooling airflow in terms of supply temperature, mass flow and even distribution, exists on the cool side B of the seal 5, to dissipate the heat flux traveling through the seal 5. By so doing this will keep the cool side B of the seal 5 close to the temperature of the cooling airflow.

Since the ratio of conductivities of Nextel to Inconel 718 is 0.1/23.9, it is clear that a very much reduced amount of cooling air is required to accommodate this greatly reduced heat flux. Herein lies the major benefit of applying an insulated seal 5. It now becomes possible to maintain the resilient sealing element at a low enough temperature to avoid stress relaxation, without incurring the cost penalty of using large amounts of cooling air.

Figure 5:
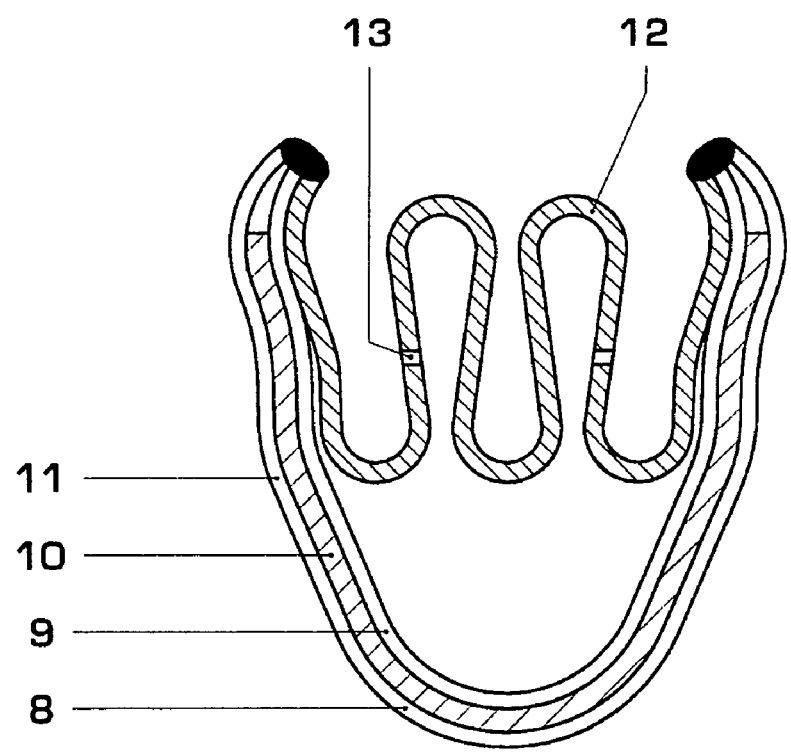
FIG. 5 illustrates a second embodiment of an inventive seal assembly.

FIG. 5 illustrates a second embodiment of an inventive seal assembly which is consists of a laminated connector plate 8 according to the present invention. As seen in FIG. 5, the connector plate 8 consists of three different layers with layer 9 of a base material, a layer 10 of a thermal insulating material, and a layer 11 of a base material or made of an oxide resistant material. The connector plate 8 is bent around and welded to the two sides of an E-seal 12. The E-seal 12 consists as well of Inconel 718. The E-seal 12 can be provided with or without cooling holes 13 for the flow of cooling air.

Figure 6:
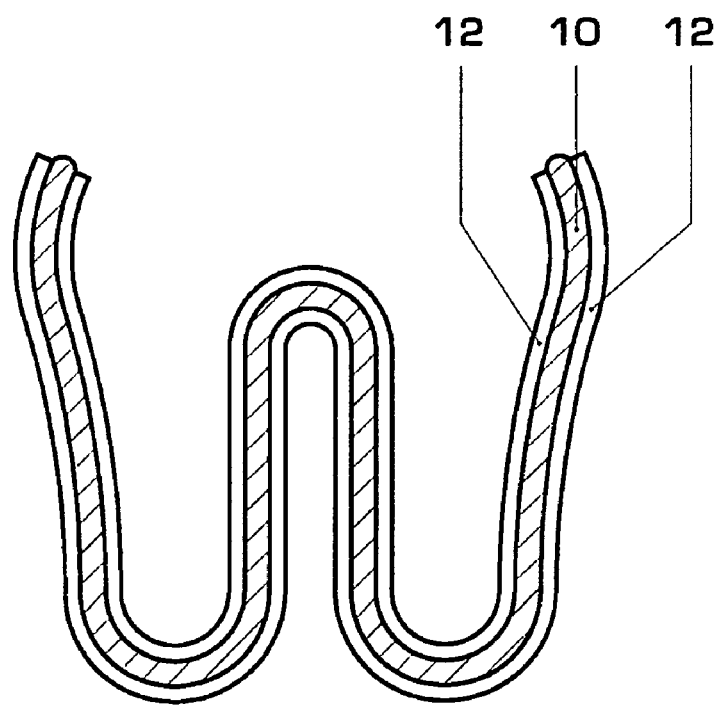
FIG. 6 shows a third embodiment of an inventive seal assembly.

FIG. 6 shows a third embodiment of an inventive seal assembly 5. It consists of two layers: an inner and an outer layer of E-seals 12 between which a layer 10 of thermal insulating material is positioned.

While our invention has been described by an example, it is apparent that other forms could be adopted by one skilled in the art. Accordingly, the scope of our invention is to be limited only by the attached claims.

REFERENCE NUMBERS

1 Combustion chamber
2 Combustor liner segment
3 Clamp strip
4 Casing
5 Seal, seal assembly
6 Cooling holes
7 Spring side support
8 Connector plate
9 Layer of a base material
10 Layer of a thermal insulating material
11 Layer of a base material or made of an oxide resistant material
12 E-seal
13 Cooling hole
A Side of the seal assembly exposed to the hot gas path
B Side of the seal assembly exposed to the cooling medium
$t_1$ Temperature of hot surface of Inconel 718 outer ply
$t_2$ Temperature of cool surface of Inconel 718 outer ply/of hot surface of Nextel
$t_3$ Temperature of cool surface of Nextel/of hot surface of Inconel 718 inner ply
$t_4$ Temperature of cool surface of Inconel 718 inner ply

What is claimed is:

1. A seal assembly comprising:
   a layered structure including
      a first layer of a first base material having two opposite sides including first and second lateral edges;
      a second layer of thermal insulating material on top of the first layer, said thermal insulating material having a thermal conductivity substantially lower than the thermal conductivity of the first base material;
      a third layer of a second base material on top of the second layer, the third layer having two opposite sides including first and second lateral edges;
   a spring side support;
   wherein the first and third layers extend beyond the second layer at said two opposite sides;
   a welding seam connecting said first and second lateral edges of said first and third layers at said two opposite sides; and
   wherein the layered structure is connected at said two opposite sides to the spring side support.

2. The seal assembly according to claim 1, wherein the layer of thermal insulating material comprises a woven insulating material.

3. The seal assembly according to claim 1, wherein the third layer of the seal assembly comprises oxidation resistant material.

4. The seal assembly according to claim 1, further comprising:
a connector plate having an inner connector band and an outer connector band; and
wherein the layered structure is arranged within the connector plate with the first layer comprising the inner connector band and the third layer comprising the outer connector band.

5. The seal assembly according to claim 4, wherein the connector plate is connected on two sides to the spring side support.

6. The seal assembly according to claim 5, wherein the spring side support comprises an E-seal.

7. The seal assembly according to claim 5, wherein the spring side support is welded to the connector plate.

8. The seal assembly according to claim 4, further comprising:
an E-seal having two sides; and
wherein the connector plate is bent around and fixed to the two sides of the E-seal.

9. The seal assembly according to claim 1, further comprising:
cooling holes arranged within the spring side support.

10. The seal assembly according to claim 1, further comprising:
two E-seals; and
wherein the layer of thermal insulating material is arranged between the two E-seals as said first and third layers.

11. The seal assembly according to claim 1, further comprising:
combustor liner segments; and
a combustor liner seal between the combustor liner segments, said combustor liner seal comprising said layered structure.

12. The seal assembly according to claim 8, further comprising:
cooling holes arranged within the E-seal.

13. A seal assembly comprising:
a layered structure including
a first layer of a first base material having two opposite sides including first and second lateral edges;
a second layer of thermal insulating material on top of the first layer, said thermal insulating material having a thermal conductivity substantially lower than the thermal conductivity of the first base material; and
a third layer of a second base material on top of the second layer, the third layer having two opposite sides including first and second lateral edges;
combustor liner segments; and
a combustor liner seal between the combustor liner segments, said combustor liner seal comprising said layered structure;
a welding seam connecting said first and second lateral edges of said first and third layers at said two opposite sides; and
wherein the first and third layers extend beyond the second layer at said two opposite sides.

14. The seal assembly according to claim 13, wherein the layer of thermal insulating material comprises a woven insulating material.

15. The seal assembly according to claim 13, wherein the third layer of the seal assembly comprises oxidation resistant material.

16. The seal assembly according to claim 13, further comprising:
a connector plate having an inner connector band and an outer connector band; and
wherein the layered structure is arranged within the connector plate with the first layer comprising the inner connector band and the third layer comprising the outer connector band.

17. The seal assembly according to claim 13, further comprising:
a spring side support connected to the layered structure.

18. The seal assembly according to claim 17, further comprising:
cooling holes arranged within the spring side support.

19. A seal assembly comprising:
a layered structure including
a first layer of a first base material having two opposite sides including first and second lateral edges;
a second layer of thermal insulating material on top of the first layer, said thermal insulating material having a thermal conductivity substantially lower than the thermal conductivity of said first base material;
a third layer of a second base material on top of the second layer, the third layer having two opposite sides including first and second lateral edges;
a spring side support;
a welding seam connecting said first and second lateral edges of said first and third layers at said two opposite sides;
wherein the layered structure is connected on said two opposite sides to the spring side support, such that the second layer is held between said first and third layers; and
wherein the first and third layers extend beyond the second layer at said two opposite sides.

20. The seal assembly according to claim 19, wherein the layer of thermal insulating material comprises a woven insulating material.

21. The seal assembly according to claim 19, wherein the third layer of the seal assembly comprises oxidation resistant material.

22. The seal assembly according to claim 19, further comprising:
a connector plate having an inner connector band and an outer connector band; and
wherein the layered structure is arranged within the connector plate with the first layer comprising the inner connector band and the third layer comprising the outer connector band.

23. The seal assembly according to claim 22, wherein the first layer is welded to the third layer.

24. The seal assembly according to claim 22, wherein the connector plate is connected on two sides to the spring side support.

25. The seal assembly according to claim 24, wherein the spring side support comprises an E-seal.

26. The seal assembly according to claim 24, wherein the spring side support is welded to the connector plate.

27. The seal assembly according to claim 22, further comprising:
   an E-seal having two sides; and
   wherein the connector plate is bent around and fixed to the two sides of the E-seal.

28. The seal assembly according to claim 27, further comprising:
   cooling holes arranged within the E-seal.

29. The seal assembly according to claim 19, further comprising:
   cooling holes arranged within the spring side support.

30. The seal assembly according to claim 19, further comprising:
   two E-seals; and
   wherein the layer of thermal insulating material is arranged between the two E-seals as said first and third layers.

31. The seal assembly according to claim 19, further comprising:
   combustor liner segments; and
   a combustor liner seal between the combustor liner segments, said combustor liner seal comprising said layered structure.

* * * * *